(12) United States Patent
Lee et al.

(10) Patent No.: US 7,016,278 B2
(45) Date of Patent: Mar. 21, 2006

(54) APPARATUS AND METHOD FOR CONTROLLING RECORDING SPEED OF OPTICAL DISC RECORDING SYSTEM

(75) Inventors: Ji-hong Lee, Suwon-si (KR); Se-tae Kim, Suwon-si (KR); Sung-un Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/774,497

(22) Filed: Feb. 10, 2004

(65) Prior Publication Data

US 2004/0156285 A1    Aug. 12, 2004

(30) Foreign Application Priority Data

Feb. 10, 2003    (KR) .................... 10-2003-0008145

(51) Int. Cl.
G11B 7/00    (2006.01)
G11B 5/09    (2006.01)
(52) U.S. Cl. .............................. 369/47.36; 369/47.44; 369/53.1; 369/44.27
(58) Field of Classification Search ............... 369/47.1, 369/47.28, 47.3, 47.36, 47.4, 53.1, 53.12, 369/53.15, 53.18, 59.1, 44.25, 44.27, 44.32, 369/124.15
See application file for complete search history.

(56) References Cited

U.S. PATENT DOCUMENTS

| 6,496,458 B1 * | 12/2002 | Tsukihashi | 369/47.47 |
| 6,556,524 B1 * | 4/2003 | Takeshita | 369/47.43 |
| 6,570,831 B1 * | 5/2003 | Choi | 369/47.28 |

FOREIGN PATENT DOCUMENTS

| JP | 11-213413 | 8/1999 |
| JP | 2000-020975 | 1/2000 |
| JP | 2000-20975 | 1/2000 |

* cited by examiner

Primary Examiner—Muhammad Edun
(74) Attorney, Agent, or Firm—Staas & Halsey LLP (57) ABSTRACT

A method of controlling a recording speed of an optical disc recording system includes detecting error information with respect to a level of a servo control signal of the optical disc recording system, and adjusting the recording speed of the optical disc recording system with reference to the error information.

16 Claims, 7 Drawing Sheets

APPARATUS AND METHOD FOR CONTROLLING RECORDING SPEED OF OPTICAL DISC RECORDING SYSTEM

CROSS-REFERENCE TO RELATED APPLICATIONS

This application claims the priority of Korean Patent Application No. 2003-8145, filed on Feb. 10, 2003, in the Korean Intellectual Property Office, the disclosure of which is incorporated herein in its entirety by reference.

BACKGROUND OF THE INVENTION

1. Field of the Invention

The present invention relates to an apparatus and method for controlling a recording speed of an optical disc recording system, and more particularly, to an apparatus and method for controlling a recording speed of an optical disc recording system to prevent a write fail from occurring due to an abnormal operation of a servo when the optical disc recording system records data on an optical disc at a high speed.

2. Description of the Related Art

In general, optical discs are roughly classified into compact discs (CDs)-read/writes (R/RWs) and digital versatile discs (DVDs)-random access memories (RAMs).

An optical disc recording system is used to record data on and/or reproduce data from such an optical disc. As the recording density of the optical disc increases, the optical disc recording system requires an optimal state and precise recording.

Figure 1:
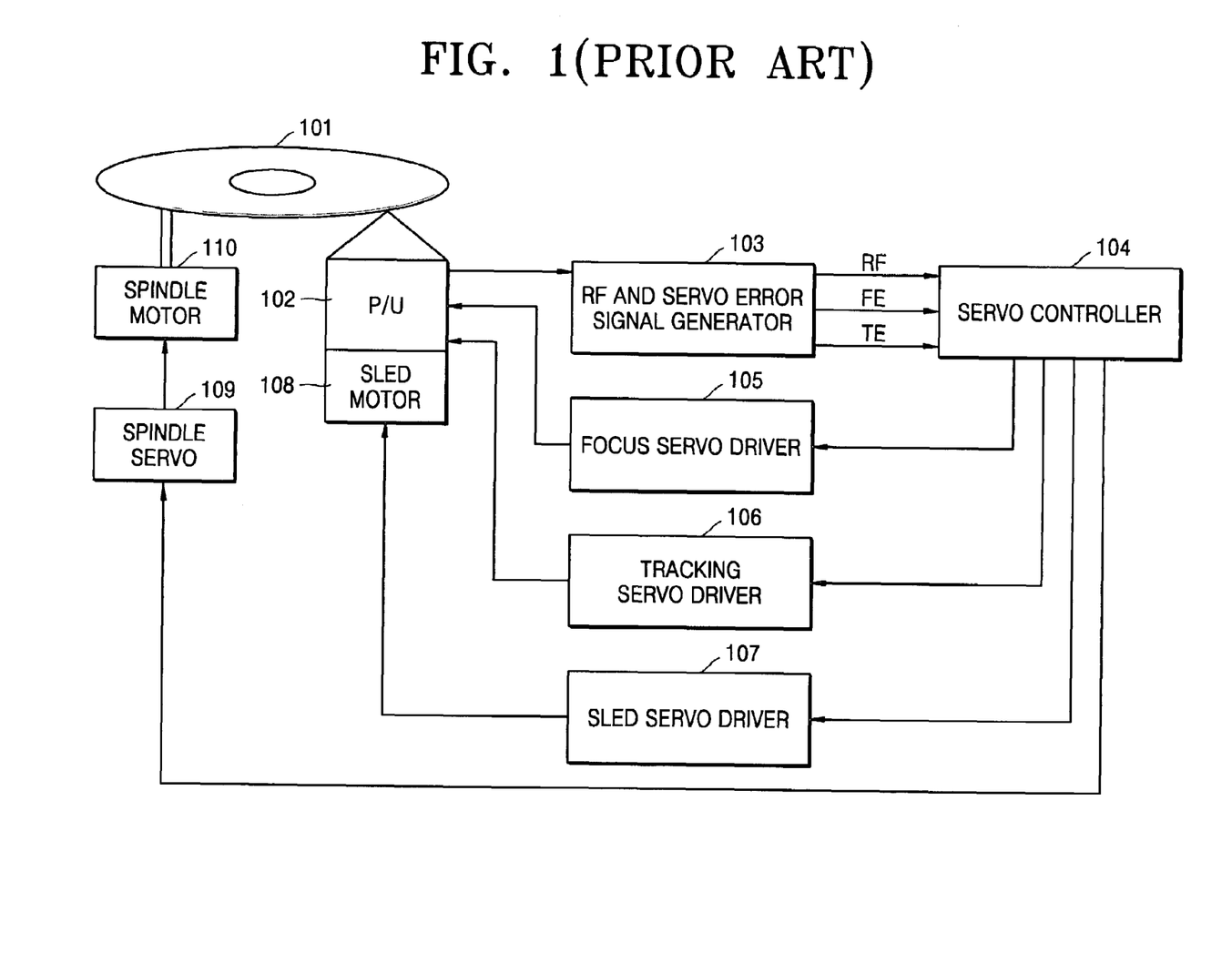
FIG. 1 is a view showing the structure of a conventional optical disc recording and/or reproducing apparatus.

FIG. 1 shows the structure of a conventional optical disc recording and/or reproducing apparatus. Referring to FIG. 1, an optical pickup 102 includes focusing and tracking actuators performing focusing and tracking, reading an optical signal from an optical disc 101 and converting the optical signal into an electric signal.

A radio frequency (RF) and servo error signal generator 103 generates an RF signal, focus error (FE) signal and a tracking error (TE) signal, from the electric signal output from the optical pickup 102.

The RF signal is transmitted to a decoder (not shown) for reproduction purposes, and the servo error signals such as the FE signal and the TE signal are transmitted to a servo controller 104.

The servo controller 104 outputs the FE signal to a focus servo driver 105 and the TE signal to a tracking servo driver 106.

Here, the focus servo driver 105 applies the FE signal to the optical pickup 102 to actuate the focusing actuator.

The tracking servo driver 106 applies the TE signal to the optical pickup 102 to actuate the tracking actuator. The optical pickup 102 moves an objective lens in a radial direction of the optical disc 101 to adjust a focus of a laser beam and follow tracks of the optical disc 101. In other words, the tracking servo driver 106 actuates the tracking actuator during normal recording and/or reproduction or moves the objective lens in the radial direction during a fine seek.

A sled servo driver 107 receives a sled control signal from the servo controller 104 to drive a sled motor 108 so that the sled motor 108 moves the optical pickup 102 in a desired direction during a rough seek.

The servo controller 104 detects information on a rotation speed of the optical disc 101 from the RF signal and outputs the rotation speed information to a spindle servo 109. The spindle servo 109 controls a spindle motor 110 via a phase-locked loop (PLL) based on the rotation speed information to rotate the optical disc 101.

Such an optical disc recording and/or reproducing apparatus increases a rotation speed of an optical disc improving a data processing speed. As a result, current optical disc drives have a speed of more than 60×. However, as the conventional optical disc recording and/or reproducing apparatus increases its recording speed, there is a high probability of the occurrence of recording errors due to defects on an optical disc.

Among these recording errors, a write fail occurs due to several factors, such as eccentricity of and radial noise from the optical disc, and the like.

In particular, when the conventional optical disc recording and/reproducing apparatus records data on the optical disc at a high speed, abnormal FE and TE signals may be generated due to eccentricity of and radial noise from the optical disc. Accordingly, the abnormal FE and TE signals make a servo unstable, and the write fail arises.

SUMMARY OF THE INVENTION

The present invention provides an apparatus and method for controlling a recording speed of an optical disc recording system to prevent a write fail from occurring due to an abnormal operation of a servo when the optical disc recording system records data on an optical disc.

According to an aspect of the present invention, there is provided a method of controlling a recording speed of an optical disc recording system, including detecting error information with respect to a level of a servo control signal of the optical disc recording system, and adjusting the recording speed of the optical disc recording system with reference to the error information.

According to another aspect of the present invention, there is provided a method of controlling a recording speed of an optical disc recording system, including detecting whether an Absolute Time In Pre-groove (ATIP) sync signal is abnormal at the recording speed of the optical disc recording system, detecting error information with respect to a level of a servo control signal of the optical disc recording system, and adjusting the recording speed of the optical disc recording system according to the error information and with reference to whether the ATIP sync signal is abnormal.

According to still another aspect of the present invention, there is provided an apparatus for controlling a recording speed of an optical disc recording system, including: a level error detector detecting error information with respect to a level of a servo control signal of the optical disc recording system; and a recording speed adjustor adjusting the recording speed of the optical disc recording system with reference to the error information.

According to yet another aspect of the present invention, there is provided an apparatus for controlling a recording speed of an optical disc recording system, including an Absolute Time In Pre-groove (ATIP) sync signal error detector detecting whether an ATIP sync signal is abnormal at the recording speed of the optical disc recording system a level error information detector detecting error information with respect to a level of a servo control signal of the optical disc recording system, and a recording speed adjustor adjusting the recording speed of the optical disc recording system with reference to the error information and as to whether the ATIP sync signal is abnormal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2A:
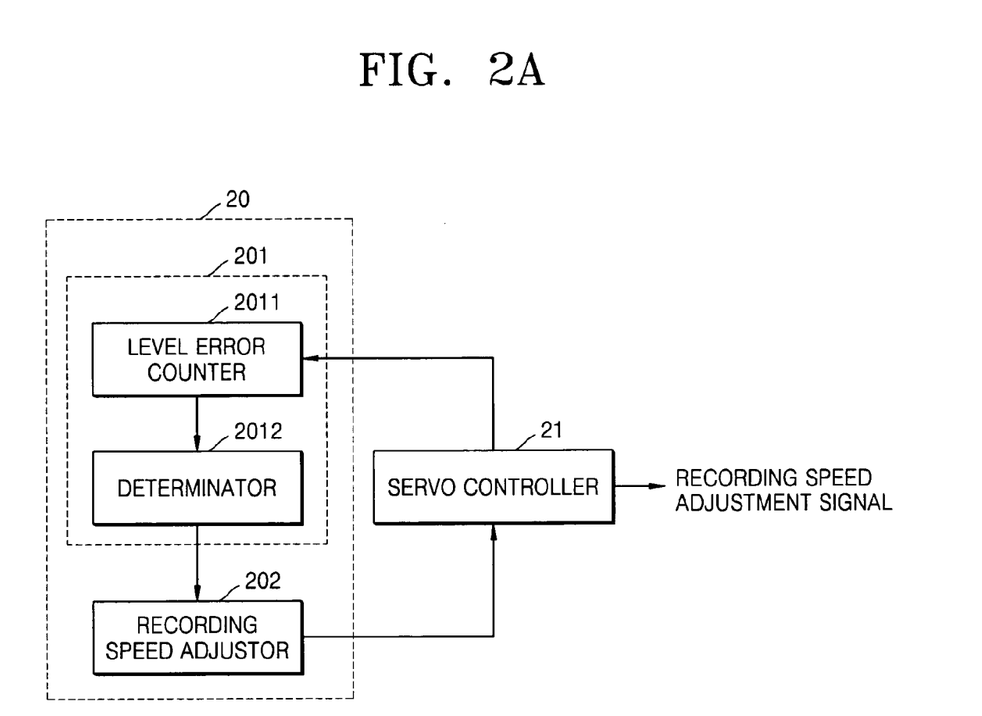
FIG. 2A is a view showing the structure of an apparatus for controlling a recording speed with respect to an optical disc, according to an embodiment of the present invention.

FIG. 2A is a view showing the structure of an apparatus for controlling a recording speed with respect to an optical disc, according to an embodiment of the present invention. Referring to FIG. 2A, a recording speed controlling apparatus 20 includes a level error information detector 201 and a recording speed adjustor 202. The level error information detector 201 detects error information with respect to a level of a servo control signal generated by a servo controller 21 of an optical disc recording system. The recording speed adjustor 202 adjusts a recording speed of the optical disc recording system with reference to the level error information. Here, the servo controller 21 receives the servo control signal such as an RF signal, an FE signal and an TE signal from an RF and servo error signal generator (corresponding to 103 of FIG. 1).

The level error information detector 201 includes a level error counter 2011 and a determinator 2012 so as to detect the level error information with respect to the servo control signal.

In other words, the level error counter 2011 receives the level error information from the servo controller 21 and counts a number, $N_R$, of times a level of the servo control signal exceeds a reference level within a predetermined period of time. Here, the predetermined period of time generally refers to a unit time for recording data but may refer to another time. Also, the reference level may vary depending on the type of the signal included in the servo control signal. In the present embodiment, the level error counter 2011 counts the number, $N_R$, of times with reference to a reference level of the TE signal, because the TE signal is greatly affected by disturbances such as eccentricity of and radial noise from an optical disc causing a write fail. In general, the reference level of the TE signal is set within a range of a peak-to-peak value of 1.18V.

The determinator 2012 receives the number, $N_R$, of times from the level error counter 2011 and compares the number, $N_R$, of level errors with an allowable number, $N_A$, of level errors.

The allowable number, $N_A$, of level errors refers to a margin to determine that recording errors do not occur when a number of level errors with respect to the TE signal does not exceed a predetermined number within the predetermined period of time. In general, an allowable number of level errors with respect to the TE signal is about 16.

When the determinator 2012 determines that the number, $N_R$, of times exceeds the allowable number, $N_A$, of level errors, the recording speed adjustor 202 determines that the TE signal is abnormal and calculates an optimal recording speed with reference to the number, $N_R$, of times. Here, the servo controller 21 generates an optimal recording speed adjustment signal based on information of the recording speed received from the recording speed adjustor 202.

When the determinator 2012 determines that the number, $N_R$, of times does not exceed the allowable number, $N_A$, of level errors, the recording speed adjustor 202 determines that the TE signal is normal and generates information on a current recording speed. The servo controller 21 receives the optimal recording speed adjustment signal from the recording speed adjustor 202 to maintain the current recording speed.

Here, the adjustment of the recording speed is achieved by reducing a recording speed of a spindle motor. The recording speed may be adjusted from a high speed to a low speed, and vice versa. However, when data is recorded at the high speed, errors such as disturbances are more likely to occur than at the low speed. Therefore, the recording speed is mostly adjusted from the high speed to the low speed.

Figure 2B:
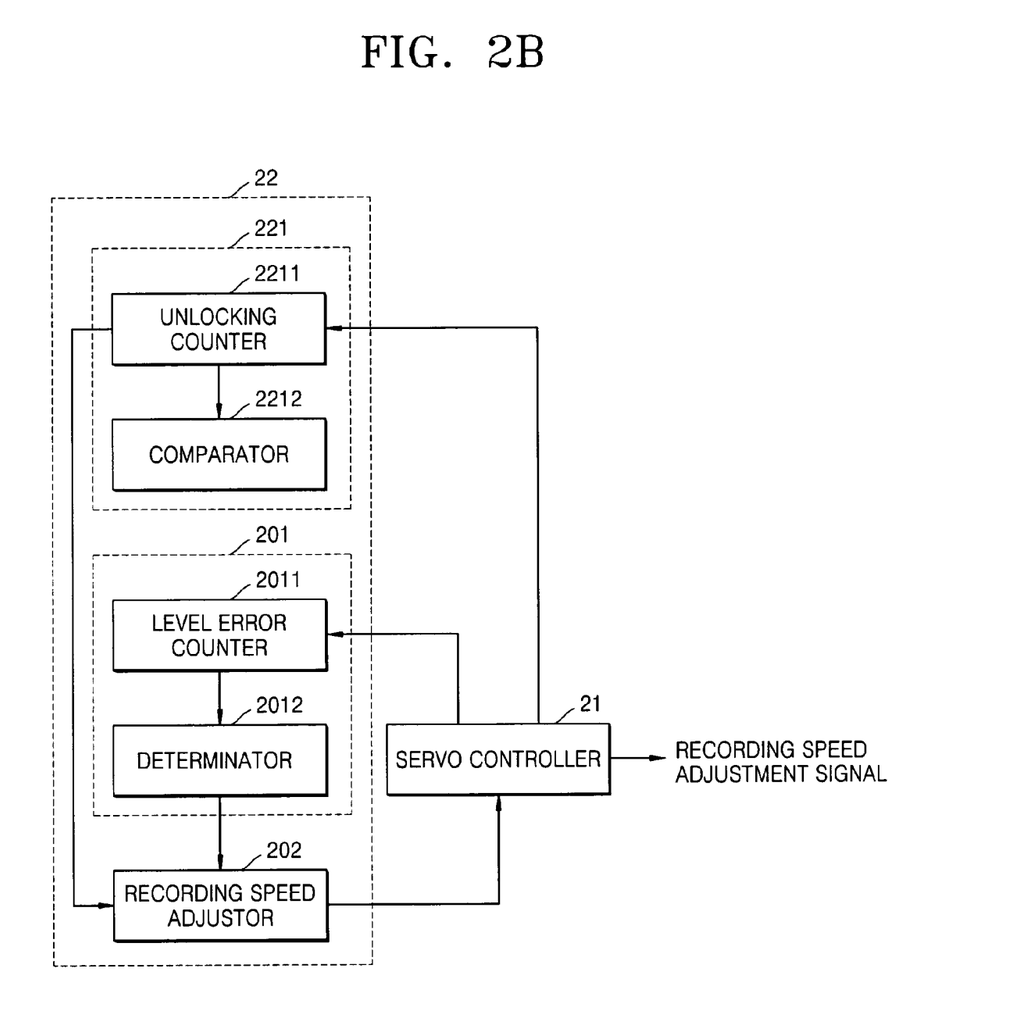
FIG. 2B is a view showing the structure of an apparatus for controlling a recording speed with respect to an optical disc, according to another embodiment of the present invention.

FIG. 2B is a view showing the structure of an apparatus for controlling a recording speed with respect to an optical disc, according to another embodiment of the present invention. Referring to FIG. 2B, a recording speed controlling apparatus 22 includes a level error information detector 201, a recording speed adjustor 202, and an Absolute Time In Pre-groove (ATIP) sync signal error detector 221. The level error information detector 201 detects error information with respect to a level of a servo control signal. The recording speed adjustor 202 adjusts a recording speed of the optical disc recording system with reference to the level error information. The ATIP sync signal error detector 221 detects whether an ATIP sync signal is abnormal.

The ATIP sync signal error detector 221 detects whether the ATIP sync signal is abnormal, i.e., unlocked, at a current recording speed. Here, the ATIP sync signal greatly affects a recording timing, a write fail or success, and a recording quality with respect to a CD-R/RW. In other words, only when the ATIP sync signal is locked, can stable recording be achieved.

Here, the ATIP sync signal error detector 221 includes an unlocking counter 2211 and a comparator 2212 so as to detect whether the ATIP sync signal is unlocked.

The unlocking counter 2211 counts a number, $U_R$, of times the ATIP sync signal is unlocked within a predetermined period of time. Here, the predetermined period of time refers to a unit time for recording data but may refer to another time.

The comparator 2212 receives the number, $U_R$, of times from the unlocking counter 2211 and compares the number, $U_R$, of times with an allowable number, $U_A$, of the predetermined period of time. When the comparator determines that the number, $U_R$, of times exceeds the allowable number, $U_A$, of unlocking times, the recording speed adjustor 202 determines that the ATIP sync signal is abnormal. When the comparator 2212 determines that the number, $U_R$, of times does not exceed the allowable number, $U_A$, of unlocking times, the recording speed adjustor 202 determines that the ATIP sync signal is normal. Here, the allowable number, $U_A$, of unlocking times refers to a margin to determine that recording errors do not occur when a number of times the ATIP sync signal is unlocked does not exceed a predetermined number. In general, the allowable number, $U_A$, of unlocking times is about 24.

The level error information detector 201 includes a level error counter 2011 and a determinator 2012 so as to detect whether the level of the servo control signal is abnormal.

The level error counter 2011 receives the level information of servo control signal from the servo controller 21 and counts a number, $N_R$, of times the level of the servo control signal exceeds a reference level within a predetermined period of time. Here, the predetermined period of time refers to a unit time for recording data but may refer to another time. Also, the reference level may vary depending on the type of signal included in the servo control signal. In the present embodiment, the number, $N_R$, of times is counted with reference to a reference level of the TE signal because the TE signal is greatly affected by disturbances such as eccentricity and radial noise causing a write fail. In general, the reference level of the TE signal is set within a range of a peak-to-peak value of 1.18V.

The determinator 2012 receives the number, $N_R$, of times from the level error counter 2011 and compares the number, $N_R$, of times with an allowable number, $N_A$, of level errors. When the determinator 2012 determines that the number, $N_R$, of times exceeds the allowable number, $N_A$, of level errors, the recording speed adjustor 202 determines that the TE signal is abnormal. When the determinator 2012 determines that the number, $N_R$, of level errors does not exceed the allowable number, $N_A$, of level errors, the recording speed adjustor 202 determines that the TE signal is normal.

The allowable number, $N_A$, of level errors refers to a margin to determine that recording errors do not occur when a number of times the level of the TE signal is abnormal does not exceed a predetermined number. In general, the allowable number, $N_A$, of level errors with respect to the TE signal is about 16.

When the number, $U_R$, of times and the number, $N_R$, of times are greater than a reference value, the recording speed adjustor 202 calculates an optimal recording speed. Here, the servo controller 21 generates an optimal recording speed adjustment signal based on information on the optimal recording speed received from the recording speed adjustor 202.

Here, the adjustment of the recording speed is mainly achieved by reducing a recording speed of a spindle motor. The recording speed may be adjusted from a high speed to a low speed, and vice versa. However, when data is recorded at the high speed, errors such as disturbances are more likely to occur than at the low speed. Therefore, the recording speed is mostly adjusted from the high speed to the low speed.

Figure 3A:
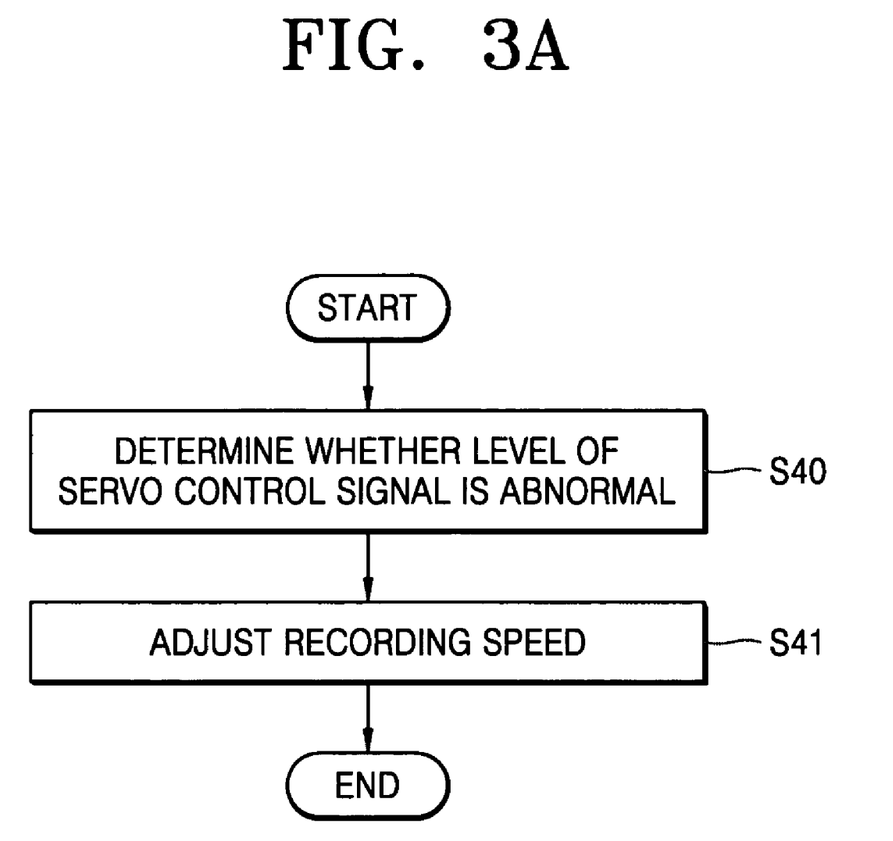
FIG. 3A is a flowchart explaining a method of controlling a recording speed with respect to an optical disc, according to an embodiment of the present invention.

FIG. 3A is a flowchart explaining a method of controlling a recording speed with respect to an optical disc, according to an embodiment of the present invention. Referring to FIG. 3A, in operation S40, a determination is made as to whether the level of the servo control signal generated by the servo controller 21 of the optical disc recording system is abnormal. In operation S41, the recording speed of the optical disc recording system is adjusted with reference to the abnormal level of the servo control signal.

Figure 3B:
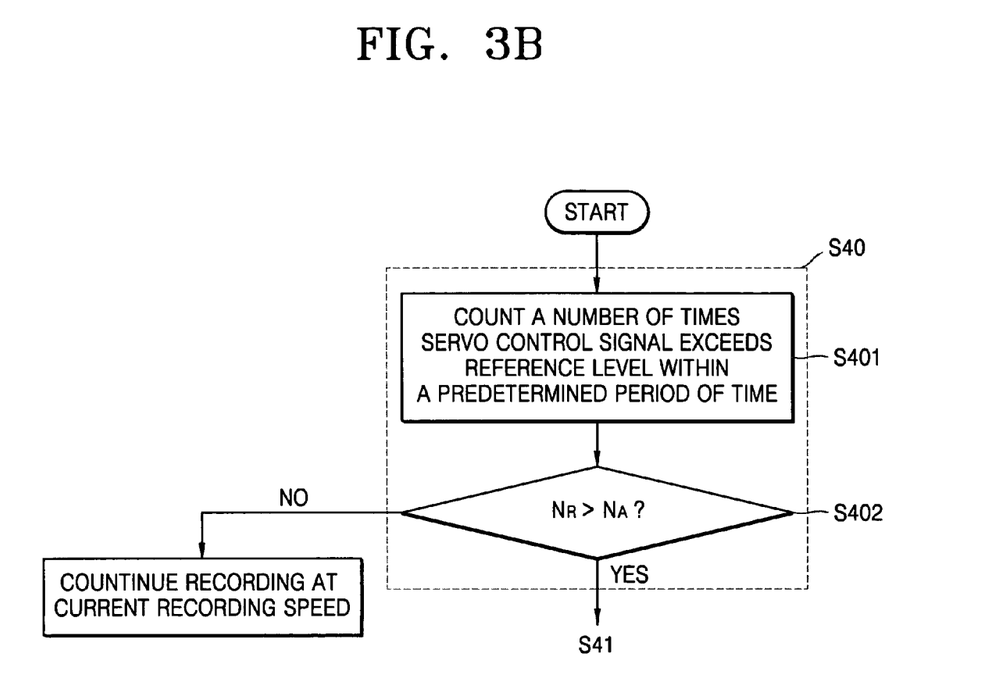
FIG. 3B is a flowchart of operation S40 of FIG. 3A.

FIG. 3B is a flowchart of operation S40 of FIG. 3A. Referring to FIG. 3B, in operation S401, the number, $N_R$, of times the level of the servo control signal exceeds the reference level within a predetermined period of time is counted. Here, the predetermined period of time generally refers to a unit time for recording data but may refer to another time. Also, the reference level may vary depending on the type of the signal included in the servo control signal. In the present embodiment, the level error counter 2011 counts the number, $N_R$, of times with reference to the reference level of the TE signal because the TE signal is greatly affected by disturbances such as eccentricity of and radial noise from an optical disc causing a write fail. In general, the reference level of the TE signal is set within a range of a peak-to-peak value of 1.18V.

In operation S402, the number, $N_R$, of times is compared with the allowable number, $N_A$, of level errors.

The allowable number, $N_A$, of level errors refers to a margin to determine that recording errors do not occur when a number of times the level of the TE signal is abnormal does not exceed a predetermined number. In general, the allowable number, $N_A$, of level errors with respect to the TE signal is about 16.

When the number, $N_R$, of times exceeds the allowable number, $N_A$, of level errors, it is determined that the TE signal is abnormal and an optimal recording speed is calculated with reference to the number, $N_R$, of times. When the number, $N_R$, of times does not exceed the allowable number, $N_A$, of level errors, it is determined that the TE signal is normal and the current recording speed is maintained.

Figure 4A:
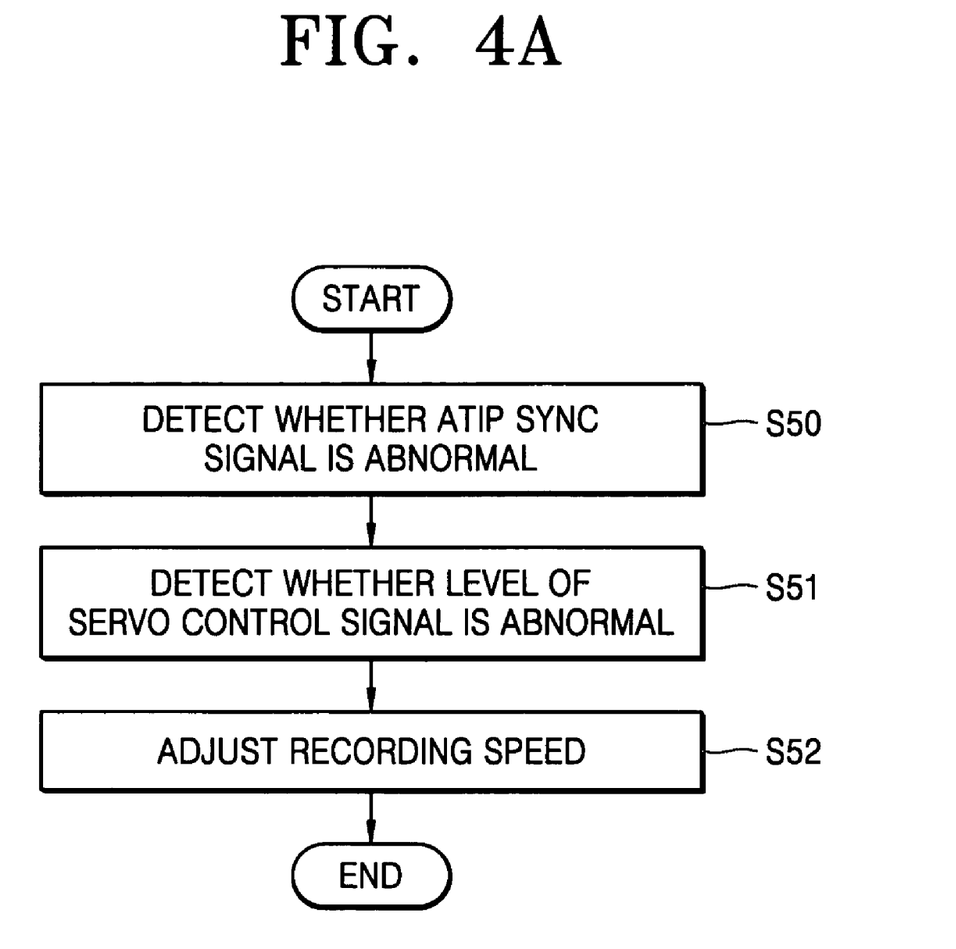
FIG. 4A is a flowchart explaining a method of controlling a recording speed with respect to an optical disc, according to another embodiment of the present invention.

FIG. 4A is a flowchart explaining a method of controlling a recording speed with respect to an optical disc, according to another embodiment of the present invention. In operation S50, a determination is made as to whether the ATIP sync signal generated by the servo controller 21 of the optical disc recording system is abnormal, i.e., unlocked, at the current recording speed. In operation S51, a determination is made as to whether the level of the servo control signal generated by the servo controller 21 is abnormal. In operation S52, the recording speed of the optical disc recording system is adjusted with reference to the ATIP sync signal and the level of the servo control signal.

Figure 4B:
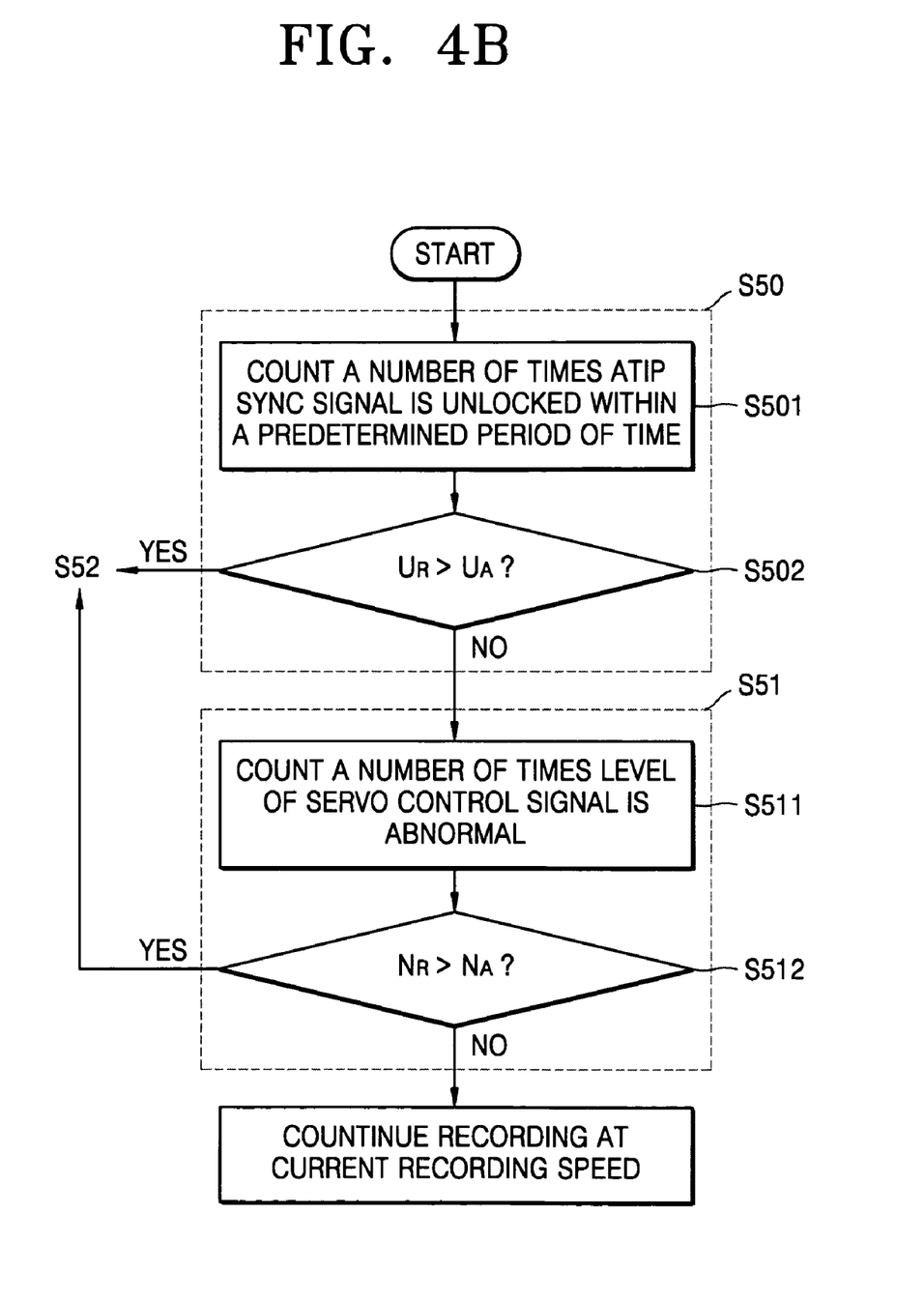
FIG. 4B is a flowchart of operations S50 and S51 of FIG. 4A.

FIG. 4B is a flowchart of operations S50 and S51 of FIG. 4A. Referring to FIG. 4B, in operation S501, the number, $U_R$, of times the ATIP sync signals are unlocked within a predetermined period of time is counted. Here, the predetermined period of time refers to a unit time for recording data but may refer to another time.

In operation S502, the number, $U_R$, of times is compared with the allowable number, $U_A$, of unlocking times. Here, the allowable number, $U_A$, of unlocking times refers to a margin to determine that recording errors do not occur when a number of times the ATIP sync signal is unlocked does not exceed a predetermined number. In general, the allowable number, $U_A$, of unlocking times is about 24.

If in operation S502, it is determined that the number, $U_R$, of times exceeds the allowable number, $U_A$, of unlocking times, in operation S52, it is determined that the ATIP sync signal is abnormal and an optimal recording speed is calculated with reference to the number, $U_R$, of times. If in operation S502, it is determined that the number, $U_R$, of times does not exceed the allowable number, $U_A$, of unlocking times, it is determined that the ATIP sync signal is normal and the current recording speed is maintained.

When the number, $U_R$, of times does not exceed the allowable number, $U_A$, of unlocking times, in operation S511, it is determined that the ATIP sync signal is normal and the number, $N_R$, of times the level of the servo control signal generated by the servo controller 21 exceeds the reference level within a predetermined period of time is counted.

In operation S512, the number, $N_R$, of times is compared with the allowable number, $N_A$, of level errors.

Here, the allowable number, $N_A$, of level errors is set as described with reference to FIG. 3B.

When the number, $N_R$, of times exceeds the allowable number, $N_A$, of level errors, in operation S52, it is determined that the TE signal is abnormal and the optimal recording speed is calculated with reference to the number, $N_R$, of times. When the number, $N_R$, of times does not exceed the allowable number, $N_A$, of level errors, it is determined that the TE signal is normal and the current recording speed is maintained.

As is described above, according to the present invention, a recording speed can be adjusted with reference to a level of a TE signal to prevent a write fail from occurring due to the instability of a servo such as eccentricity and radial noise. As a result, data can be stably recorded on an optical disc. In addition, the recording speed can be precisely adjusted with reference to the unlocking state of an ATIP sync signal which greatly affects a recording timing.

The present invention can be realized as a computer-readable code on a computer-readable recording device. The computer-readable recording device includes all kinds of recording apparatuses to store computer-readable data. Examples of the computer-readable recording device include a ROM, RAM, a CD-ROM, a magnetic tape, a hard disc, a floppy disc, a flash memory, an optical data storage device, a carrier wave medium, etc., on which the process and data structures of the present invention can be stored and distributed. The operations can also be distributed via, for example, downloading over a network such as the Internet.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a recording speed of an optical disc recording system, comprising:
   detecting error information with respect to a level of a servo control signal of the optical disc recording system; and
   adjusting the recording speed of the optical disc recording system with reference to the detected error information,
   wherein the servo control signal is a tracking error signal, and
   wherein the detection of the error information comprises:
      counting a number of times the level of the servo control signal exceeds a reference level within a predetermined period of time; and
      comparing the counted number of times the level of the servo control signal exceeds the reference level within the predetermined period of time, with an allowable number of level errors.

2. A method of controlling a recording speed of an optical disc recording system, comprising:
   detecting whether an Absolute Time In Pre-groove (ATIP) sync signal is abnormal at the recording speed of the optical disc recording system;
   detecting error information with respect to a level of a servo control signal of the optical disc recording system; and
   adjusting the recording speed of the optical disc recording system with reference to whether the ATIP sync signal is abnormal and the detected error information.

3. The method of claim 2, wherein the detection as to whether the ATIP sync signal is abnormal comprises:
   counting a number of times the ATIP sync signal is unlocked within a predetermined period of time; and
   comparing the counted number of times the ATIP sync signal is unlocked within the predetermined period of time, with an allowable number of unlocking times.

4. The method of claim 2, wherein the detection of the error information comprises:
   counting a number of times the level of the servo control signal exceeds a reference level within a predetermined period of time; and
   comparing the counted number of times the level of the servo control signal exceeds the reference level within the predetermined period of time, with an allowable number of level errors.

5. The method of claim 2, wherein the servo control signal is a tracking error signal.

6. An apparatus controlling a recording speed of an optical disc recording system, comprising:
   a level error detector detecting error information with respect to a level of a servo control signal of the optical disc recording system; and
   a recording speed adjustor adjusting the recording speed of the optical disc recording system with reference to the error information,
   wherein the servo control signal is a tracking error signal, and
   wherein the level error detector comprises:
      a level error counter counting a number of times the level of the servo control signal exceeds a reference level within a predetermined period of time; and
      a determinator comparing the counted number of times the level of the servo control signal exceeds the reference level within the predetermined period of time, with an allowable number of level errors.

7. An apparatus controlling a recording speed of an optical disc recording system, comprising:
   an Absolute Time In Pre-groove (ATIP) sync signal error detector detecting whether an ATIP sync signal is abnormal at the recording speed of the optical disc recording system;
   a level error information detector detecting error information with respect to a level of a servo control signal of the optical disc recording system; and
   a recording speed adjustor adjusting the recording speed of the optical disc recording system with reference to whether the ATIP sync signal is abnormal and the error information.

8. The apparatus of claim 7, wherein the ATIP sync signal error detector comprises:
   an unlocking counter counting a number of times the ATIP sync signal is unlocked within a predetermined period of time; and
   a comparator comparing the counted number of times the ATIP sync signal is unlocked within the predetermined period of time, with an allowable number of unlocking times.

9. The apparatus of claim 7, wherein the level error information detector comprises:
- a level error counter counting a number of times the level of the servo control signal exceeds a reference level within a predetermined period of time; and
- a determinator comparing the counted number of times the level of the servo control signal exceeds the reference level within the predetermined period of time, with an allowable number of level errors.

10. The apparatus of claim 7, wherein the servo control signal is a tracking error signal.

11. An optical recording device including an executable program code, the code comprising:
- detecting error information with respect to a level of a servo control signal of the optical disc recording system; and
- adjusting the recording speed of the optical disc recording system with reference to the error information,
- wherein the servo control signal is a tracking error signal, and
- wherein the detection of the error information of the executable program code comprises:
  - counting a number of times the level of the servo control signal exceeds a reference level within a predetermined period of time; and
  - comparing the counted number of times the level of the servo control signal exceeds the reference level within the predetermined period of time, with an allowable number of level errors.

12. The optical recording device of claim 11, wherein the detection of the error information of the executable program code comprises:
- counting a number of times the level of the servo control signal exceeds a reference level within a predetermined period of time; and
- comparing the counted number of times the level of the servo control signal exceeds the reference level within the predetermined period of time, with an allowable number of level errors.

13. An optical recording device including an executable program code, the code comprising:
- detecting whether an Absolute Time In Pre-groove (ATIP) sync signal is abnormal at the recording speed of the optical disc recording system;
- detecting error information with respect to a level of a servo control signal of the optical disc recording system; and
- adjusting the recording speed of the optical disc recording system with respect to the detected error information and with reference to whether the ATIP sync signal is abnormal.

14. The optical recording device of claim 13, including the executable program code, wherein the detection as to whether the ATIP sync signal is abnormal comprises:
- counting a number of times the ATIP sync signal is unlocked within a predetermined period of time; and
- comparing the counted number of times the ATIP sync signal is unlocked within the predetermined period of time, with an allowable number of unlocking times.

15. The optical recording device of claim 13, including the executable program code, wherein the detection of the error information comprises:
- counting a number of times the level of the servo control signal exceeds a reference level within a predetermined period of time; and
- comparing the counted number of times the level of the servo control signal exceeds the reference level within the predetermined period of time, with an allowable number of level errors.

16. The optical recording device of claim 13, including the executable program code, wherein the servo control signal is a tracking error signal.

* * * * *